Feb. 22, 1938.                     G. H. FISHER                    2,109,062
                            TEMPERATURE CONTROL SYSTEM
                              Filed Sept. 5, 1935
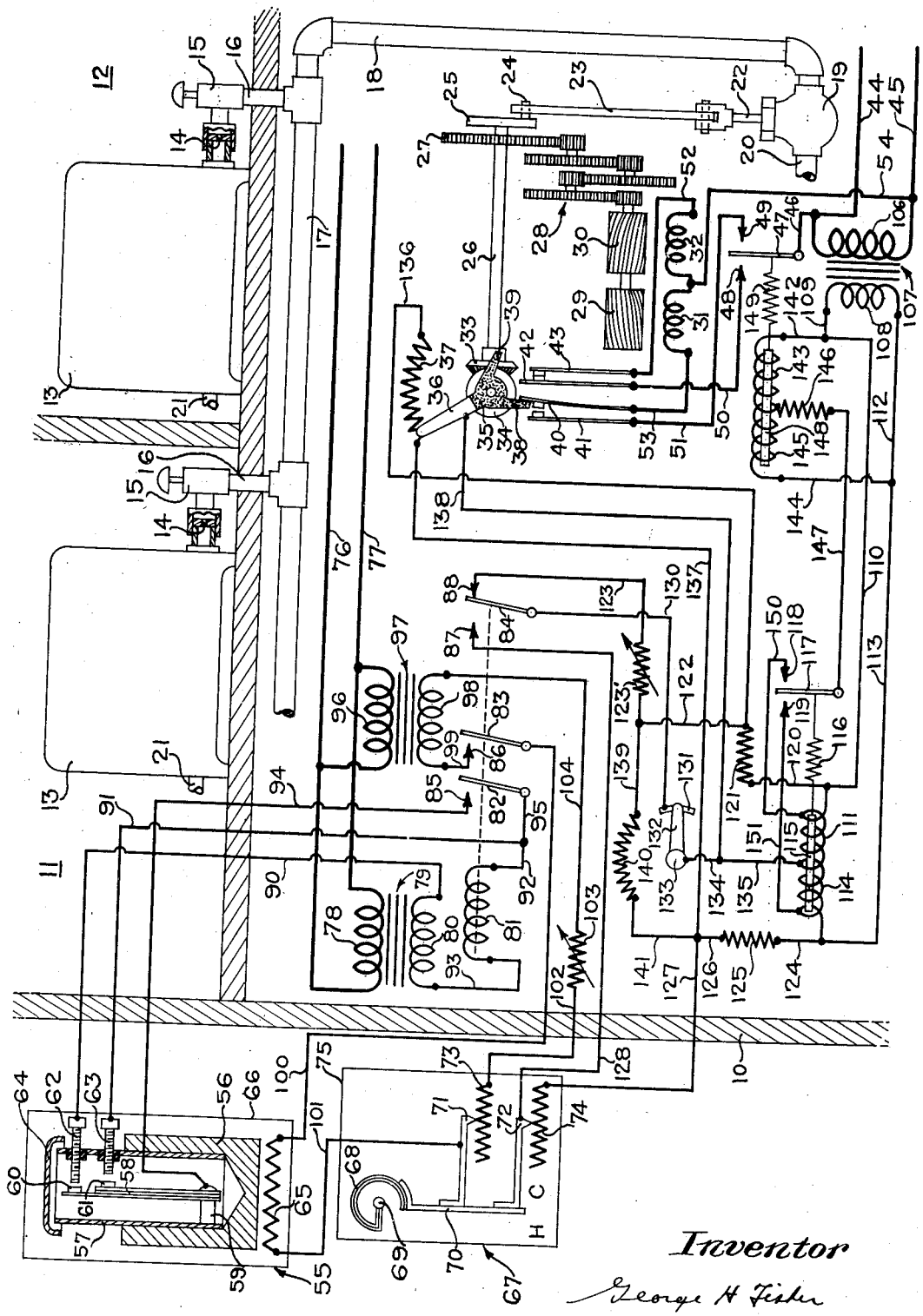
Inventor
George H Fisher Patented Feb. 22, 1938

2,109,062

UNITED STATES PATENT OFFICE 2,109,062

TEMPERATURE CONTROL SYSTEM

George H. Fisher, Minneapolis, Minn., assignor to Minneapolis-Honeywell Regulator Company, Minneapolis, Minn., a corporation of Delaware Application September 5, 1935, Serial No. 39,256

15 Claims. (Cl. 236—91)

This invention relates to temperature control systems of the type disclosed in the application of Daniel G. Taylor, Serial No. 512,887, filed February 2nd, 1931.

The system disclosed in the above referred to Taylor application comprises an outdoor controller responsive to outdoor atmospheric conditions, including temperature, wind and solar radiation for controlling the temperature within a building. Heating means are provided in the building for supplying heat to the building, and heating means are also provided in the outdoor controller for supplying heat to the outdoor controller. The two heating means are proportioned according to the heat losses from the building and from the outdoor controller. A thermostatic device is provided in the outdoor controller for responding to the temperature within the outdoor controller and when this thermostatic device calls for heat both of the heating means are energized to deliver heat to the building and to the outdoor controller. Due to the proportional relationship of the heating means to the heat losses of the building and the outdoor controller, a definite temperature relation is maintained within the building and the outdoor controller so that by responding to the temperature of the outdoor controller the thermostatic device maintains a substantially constant or normal temperature within the building.

Such a system gives excellent results when the outdoor temperatures are relatively low. However, due to the intermittent operation of the system, over-heating during mild weather is sometimes brought about, this over-heating being caused by the admission of a full charge of heating fluid, such as steam, to the radiators or heat exchangers within the building. This full charge of heating fluid admitted during mild weather necessarily causes over-heating of the building.

It is, therefore, an object of this invention to decrease the amount of heat delivered to the building during mild weather, whereby over-heating of the building is prevented.

By decreasing the amount of heat delivered to the building during mild weather, the amount of heat delivered to the outdoor controller must likewise be decreased in order to maintain the proportional relationship existing between the heating effect of the heating means and the heat losses of the building and the outdoor controller.

It is, therefore, another object of this invention to decrease the amount of heat delivered to the building and to the outdoor controller upon an increase in outdoor temperature.

It is another object of this invention to provide a control system for a heating system wherein the control system causes intermittent operation of the heating system, and wherein means are provided for adjusting the operation of the heating system in accordance with outdoor temperature conditions to prevent over-heating of the building.

It is a further object of this invention to provide in a control system of the class described above, means whereby the automatic control of the system is rendered inoperative and the heating system is placed under manual control.

Other objects and advantages will become apparent to those skilled in the art upon references to the accompanying specification, claims and drawing, in which drawing is diagrammatically illustrated the preferred form of my invention.

The control system is shown as applied to a building having an outside wall 10, and a plurality of spaces or rooms 11 and 12, the temperatures of which are to be controlled. Located in the rooms 11 and 12 are radiators 13 which receive a supply of heating fluid, such as steam, through orifices 14 from risers 16 under the control of manually operated valves 15. The risers 16 are connected into a header 17 which receives its supply of steam from a pipe 18 controlled by a valve 19. Steam is supplied to the above system by a pipe 20 leading from some source of steam, not shown. The condensate from the radiators, or heat exchangers, 13 may be disposed of in any suitable manner through return pipes 21.

The valve 19 is operated by a valve stem 22 which is connected to one end of a pitman 23. The other end of the pitman 23 is connected to a crank pin 24 mounted on a crank disc 25, carried by a shaft 26. The shaft 26 may be operated by a proportioning motor of the type shown and described in application Serial No. 673,236, filed by Lewis L. Cunningham, on May 27th, 1933.

For purposes of illustration in this application, the proportioning motor is shown as comprising a gear 27 mounted on the shaft 26 and rotated through a reduction gear train designated at 28 by motor rotors 29 and 30. The rotors 29 and 30 are operated by field windings 31 and 32, respectively, the arrangement being such that when the field winding 32 is energized the valve 19 is moved toward open position, and when the field winding 31 is energized the valve 19 is moved toward closed position. Also mounted on the shaft 26 is a bevelled gear 33 which meshes with a bevelled gear 34 carrying an abutment member 35. The abutment member 35 is equipped with a slider 36 which is adapted to slide across a balancing potentiometer coil 37. The abutment member 35 also carries fingers 38 and 39 which are adapted to engage, respectively, contacts 40 and 42. Engagement of the finger 38 with the contact 40 breaks contact between the contact 40 and a stationary contact 41. Likewise, movement of the finger 39 into engagement with the contact 42 breaks contact between the contact 42 and a stationary contact 43. The contacts 40, 41, 42 and 43 form limit switches to limit the movement of shaft 26 in a manner which will become evident hereinafter.

Leading from some source of power, not shown, are line wires 44 and 45, the line wire 44 being connected by a wire 46 to a pivoted switch arm 47. The switch arm 47 is adapted to engage spaced contacts 48 and 49, the contact 48 being connected by a wire 50 to the contact 42, and the contact 49 being connected by a wire 51 to the contact 41. The contact 43 is connected by a wire 52 to one end of the field winding 32, and the contact 40 is connected by a wire 53 to one end of the field winding 31. The other ends of the field windings 31 and 32 are connected together and by a wire 54 to the line wire 45.

Movement of the switch arm 47 into engagement with the contact 48 completes a circuit from the line wire 44 through wire 46, switch arm 47, contact 48, wire 50, contacts 42 and 43, wire 52, field winding 32 and wire 54, back to the other line wire 45 to cause energization of the field winding 32 to move the valve 19 towards an open position. Movement of the switch arm 47 into engagement with the contact 49 completes a circuit from the line wire 44 through wire 46, switch arm 47, contact 49, wire 51, contacts 41 and 40, wire 53, field winding 31 and wire 54, back to the line wire 45 to energize the field winding 31 to move the valve 19 towards a closed position. When the valve 19 is moved to either full closed or full open position the limit switches are opened to de-energize the field windings 31 or 32 to prevent over-travel of the proportioning motor.

Located outside of the building, so as to be subject to the same atmospheric conditions as the building, is an outdoor controller 55. The outdoor controller 55 comprises a block 56 which is hollowed out to receive a container 57. Located within the container 57 is a bimetallic element 58 mounted on a post 59. The bimetallic element 58 carries a contact 61 and controls a contact 60 which contacts are adapted to sequentially engage adjustable contacts 62 and 63 upon a decrease in temperature affecting the thermostatic element 58, the contacts 62 and 63 being supported by container 57 through suitable insulation. The container 57 is closed at its upper end by means of a cover 64 so that the thermostatic element 58 will not be directly affected by outside temperature, but will respond directly to the temperature of the block 56. The block 56 is cooled by the outdoor atmosphere and is heated by means of a heater which may be in the form of an electrical resistance heater 65. The outdoor controller 55 is enclosed within a weather-tight casing diagrammatically shown at 66.

Also located outside of the building so as to respond to outdoor temperature conditions is an outdoor controller 67. This controller 67 comprises a bimetallic element 68 suitably mounted on a post 69 for operating an arm 70. The arm 70 carries a slider 71 adapted to slide across a resistance coil 73, and also carries a second slider 72 adapted to slide across a resistance coil 74. Upon an increase in outdoor temperatures the sliders 71 and 72 are moved to the left with respect to their resistance coils 73 and 74 in the direction of the character H and upon a decrease in temperature they are moved to the right in the direction of the character "C". The elements of the outdoor controller 67 may be suitably mounted in a weather-tight casing 75, to prevent deterioration of the same.

Line wires leading from some source, not shown, are designated at 76 and 77. The primary 78 of a step down transformer 79 having a secondary 80 is connected across the line wires 76 and 77. A relay coil is designated at 81 for operating switch arms 82, 83 and 84 with respect to contacts 85, 86, 87 and 88. Upon energization of the relay coil 81 the switch arms 82, 83 and 84 are moved to the left into engagement with the contacts 85, 86 and 87, respectively. Upon de-energization of the relay coil 81, the switch arms 82, 83 and 84 are moved out of engagement with the contacts 85, 86 and 87, respectively, and the switch arm 84 is moved into engagement with the contact 88. One end of the secondary 80 is connected by a wire 90 to the adjustable contact 62 of the outdoor controller 55. The other adjustable contact 63 is connected by wires 91 and 92 to one end of the relay coil 81. The other end of the relay coil 81 is connected by a wire 93 to the other end of the secondary 80. The bimetallic element 58 is connected by a wire 94 to the contact 85 and the switch arm 82, associated with the contact 85, is connected by a wire 95 to the junction of wires 91 and 92.

Also connected across the line wires 76 and 77 is the primary 96 of a step-down transformer 97, having a secondary 98. One end of the secondary 98 is connected by a wire 99 to the contact 86. The switch arm 83, associated with the contact 86, is connected by a wire 100 to one end of the heater 65. The other end of the heater 65 is connected by a wire 101 to the slider 71 of the outdoor controller 67. The resistance coil 73, associated with the slider 71, is connected by a wire 102, variable resistance 103 and a wire 104 to the other end of the secondary 98.

Upon a decrease in the temperature of the block 56 of the outdoor controller 55, the contact 60 is moved into engagement with the contact 62, and upon a further decrease in temperature, the contact 61 is moved into engagement with the contact 63. This causes completion of a circuit from the secondary 80 through wire 90, contacts 62, 60, 61 and 63, wires 91 and 92, relay coil 81 and wire 93, back to the secondary 80. This causes energization of the relay coil 81 to move the switch arms 82, 83 and 84 into engagement with the contacts 85, 86 and 87. Movement of the switch arm 82 into engagement with the contact 85 completes a maintaining circuit from the secondary 80 through wire 90, contacts 62 and 60, bimetallic element 58, wire 94, contact 85, switch arm 82, wires 95 and 92, relay coil 81 and wire 93, back to the secondary 80. Completion of this circuit maintains the relay coil 81 energized until contact between the contacts 60 and 62 is broken. Movement of the switch arm 83 into engagement with the contact 86 causes completion of a circuit from the secondary 98 through wire 99, contact 86, switch arm 83, wire 100, heater 65, wire 101, slider 71, resistance 73, wire 102, variable resistance 103 and wire 104, back to the secondary 98. This causes energization of the heater 65 to cause heating of the block 56. When the temperature of the block 56 has risen sufficiently high so as to break contact between the contacts 60 and 62, the relay coil 81 is de-energized to move the switch arms 82, 83 and 84 out of engagement with the contacts 85, 86 and 87, and to move the switch arm 84 into engagement with the contact 88. The variable resistance 103 provides manual means for adjusting the heating effect of the heating element 65.

Connected across the line wires 44 and 45 is a primary 106 of a step-down transformer 107 having a secondary 108. One end of the secondary 108 is connected by wires 109 and 110 to one end of a coil 111. In a like manner, the other end of the secondary 108 is connected by wires 112 and 113 to one end of a coil 114, the other ends of the coils 111 and 114 being connected together. The coils 111 and 114 control the operation of an armature or core 115, which is connected by means of a spring 116 to a pivoted switch arm 117. The switch arm 117 is adapted to engage contacts 118 and 119, the arrangement being such that when the coil 111 is energized more than the coil 114 the switch arm 117 is moved into engagement with the contact 118, and when the coil 114 is energized more than the coil 111 the switch arm 117 is moved into engagement with the contact 119. When the coils 111 and 114 are equally energized, the switch arm 117 assumes a position mid-way between the contacts 118 and 119 as shown in the drawing.

The outer end of the coil 111 is connected by a wire 120, a protective resistance 121, a wire 122, a variable resistance 123', and a wire 123 to the contact 88. The outer end of the coil 114 is connected by a wire 124, a protective resistance 125, wires 126 and 127, the resistance 74, slider 72 and wire 128 to the contact 87. The switch arm 84 which cooperates with the contacts 87 and 88, is connected by a wire 130 to an "automatic" contact 131. A slider 132 manually operated by a knob 133 is adapted to engage the "automatic" contact 131 and is connected by wires 134 and 135 to the junction of coils 111 and 114. The junction of the protective resistance 121 and the wire 122 is connected by a wire 136 to the right hand end of the balancing potentiometer coil 37. Likewise, the junction of wires 126 and 127 is connected by a wire 137 to the left hand end of the balancing potentiometer coil 37. The slider 36, associated with the balancing potentiometer coil 37, is connected by a wire 138 to the junction of wires 134 and 135. The wire 122 and the left hand end of variable resistance 123' are connected by a wire 139 to the right hand end of a resistance 140, the other end of the resistance 140 being connected by a wire 141 to the junctions of wires 126, 127 and 137. When the slider 132 is moved out of engagement with the "automatic" contact 131 and into engagement with the resistance coil 140 manual control of the system is made possible in a manner to be brought out more clearly hereafter.

The junction of wires 109 and 110 is connected by a wire 142 to one end of a coil 143, and likewise the junction of wires 112 and 113 is connected by a wire 144 to one end of a coil 145. The other ends of the coils 143 and 145 are connected together and by a resistance 146 and a wire 147 to the pivoted switch arm 117. The coils 143 and 145 are adapted to control an armature or core 148, which is connected by means of a spring 149 to the pivoted switch arm 47 so that when the coil 143 is energized more than the coil 145 the switch arm 47 is moved into engagement with the contact 49, and when the coil 145 is energized more than the coil 143, the switch arm 47 is moved into engagement with the contact 48. When the coils 143 and 145 are equally energized switch arm 47 assumes a mid-position between the contacts 48 and 49 as shown in the drawing. The contact 118 associated with the pivoted switch arm 117 is connected by a wire 150 to a small number of turns of the coil 111, and the contact 119 is likewise connected by a wire 151 to a small number of turns of the coil 114.

From the above it is seen that the upper end of the secondary 108, the right hand end of the coil 111, the contact 88 and the right hand end of the balancing potentiometer coil 37 are connected together, and that the lower end of the secondary 108, the left hand end of the coil 114, the contact 87 and the left hand end of the balancing potentiometer coil 37 are connected together. The slider 36, the switch arm 84 and the junction of coils 111 and 114 are connected together during automatic operation of the system. From the above connections it is seen that the balancing potentiometer coil 37, the coils 111 and 114 in series and the secondary 108 are connected in parallel.

With the sliders 71 and 72 located in their extreme right hand positions with respect to the resistances 73 and 74 by reason of cold outdoor temperatures and with the remaining parts in the position shown in the drawing, the valve 19 is closed, the switch arm 84 is in engagement with the contact 88, the slider 36 is in the extreme left hand position with respect to the balancing potentiometer coil 37, the coils 111 and 114 are equally energized and, therefore, the switch arm 117 is mid-way between the contacts 118 and 119. Upon energization of the relay coil 81 to move the switch arm 84 into engagement with the contact 87 and by reason of the parallel relationship pointed out above, the coil 114 is partially short circuited by a circuit extending from the junction of coils 111 and 114 through wires 135 and 134, slider 132, "automatic" contact 131, wire 130, switch arm 84, contact 87, wire 128, slider 72, wires 127 and 126, protective resistance 125 and wire 124, back to the coil 114. This circuit decreases the energization of the coil 114 and increases the energization of the coil 111 to move the switch arm 117 into engagement with the contact 118. Movement of the switch arm 117 into engagement with the contact 118 completes a circuit from the secondary 108 through wires 112 and 144, coil 145, resistance 146, wire 147, switch arm 117, contact 118, wire 150, a small number of turns of coil 111 and wires 110 and 109, back to the secondary 108. Completion of this circuit places the resistance 146 and the small number of turns of coil 111 in parallel with coil 143 whereby to decrease the energization thereof, and increase the energization of the coil 145 in respect thereto. This causes movement of the switch arm 47 into engagement with contact 48 to cause energization of the field winding 32, in the manner pointed out above, to move the valve 19 toward an open position. The energization of the small number of turns of coil 111 increases the contact pressure between switch arm 117 and contact 118. Movement of the valve 19 toward an open position causes movement of the slider 36 to the right with respect to the balancing potentiometer coil 37. Movement of the slider 36 towards the right with respect to the balancing potentiometer coil 37 causes a partial short circuiting of the coil 111 to decrease the energization thereof and to increase the energization of the coil 114, it being remembered that movement of the switch arm 84 into engagement with the contact 87 increased the energization of the coil 111 and decreased the energization of the coil 114. When the slider 36 has moved sufficiently far to the right to rebalance the energization of coils 111 and 114 the switch arm 117 is moved out of engagement with the contact 118 to the midposition shown in the drawing. This causes substantially equal energization of the coils 143 and 145 to move the switch arm 47 out of engagement with the contact 48 to stop energization of the field winding 32, whereby the valve 19 is maintained in its open position. Also, the small number of turns of coil 111 is de-energized so that switch arm 117 moves further from contact 118 to insure a good, clean break between these parts.

Movement of the switch arm 84 into engagement with the contact 88 causes a partial short circuiting of the coil 111 to decrease the energization thereof and increase the energization of the coil 114. This causes movement of the switch arm 117 into engagement with the contact 118 to complete a circuit from the secondary 108 through wires 109 and 142, coil 143, resistance 146, wire 147, switch arm 117, contact 119, wire 151, a small number of turns of coil 114 and wires 113 and 112 back to the secondary 108. Completion of this circuit places resistance 146 and the small number of turns of coil 114 in parallel with coil 145 whereby to decrease the energization thereof and increase the energization of coil 143 to move the switch arm 47 into engagement with the contact 49. This causes energization of the field winding 31, in the manner pointed out above to move the valve 19 towards a closed position. Energization of the small number of turns of coil 114 increases the pressure between switch arm 117 and contact 119. Movement of the valve 19 towards a closed position causes left hand movement of the slider 36 with respect to the balancing potentiometer coil 37 to partially short circuit the coil 114 to decrease the energization thereof and increase the energization of coil 111, it being remembered that the coil 114 was energized more than the coil 111 by reason of movement of the switch arm 84 into engagement with the contact 88. When the slider 36 has moved sufficiently far to the left to cause a substantial re-balancing of the coils 111 and 114, the switch arm 117 is moved out of engagement with the contact 119 to balance the energization of the coils 143 and 145. This causes movement of the switch arm 47 out of engagement with the contact 49 to the midposition as shown in the drawing to de-energize the field winding 31 to maintain the valve 19 in a closed position. Separation of switch arm 117 from contact 119 also interrupts the circuit through the small number of turns of coil 114 so that switch arm 117 moves further from contact 119, as pointed out above. The circuits through coils 143 and 145 pass through a small number of turns of the coils 111 and 114 to forcibly hold the switch arm 117 in engagement with the contacts 118 or 119, whereby relay chatter is effectively prevented. It is also noted that movement of the switch arm 84 into engagement with contacts 87 and 88 causes substantially complete short circuiting of the coils 114 and 111, respectively, so that in order to re-balance the coils 114 and 111 slider 36, operated by the proportioning motor, must move to either extreme position with respect to the balancing potentiometer coil 37. Complete short circuiting is prevented by the protective resistances 121 and 125 which protect the circuits. Therefore, the valve 19 is moved to either a full closed position or a full open position by the switch arm 84 engaging the contact 87 or 88. This would cause a full charge of heating fluid to be admitted to the radiators, or heat exchangers, 13, whenever the relay coil 81 is energized. As pointed out above, this is not desirous in mild weather since the full charge of steam being admitted to the radiators 13 may cause overheating of the building. In order to remedy this, I have provided a means whereby the valve 19 is moved only to a partially open position during mild weather. This mode of operation is accomplished by the slider 72 and the resistance 74. Slider 72 is moved by the thermostatic element 68 to add resistance to the circuit which causes short circuiting of the coil 114 when the outdoor temperature increases above a predetermined value. Therefore, as the outdoor temperature increases, the coil 114 is not substantially completely short circuited as pointed out above and therefore complete right hand movement of the slider 36 with respect to the balancing potentiometer coil 37 is not required to rebalance the coils 111 and 114. It follows that the valve 19 is only moved to a partially open position when the thermostatic element 68 of the controller 67 places resistance in circuit with the coil 114. Since more of the resistance 74 becomes effective in this manner upon greater increases in outdoor temperature, opening movement of the valve 19 will be limited to a greater extent so that on extremely mild days the valve 19 will not be opened as far as on those days when the weather is not so mild.

The control system is so adjusted by manual manipulation of the variable resistances 103 that the amount of heat delivered to the building and the amount of heat delivered to the outdoor controller 55 is proportional to the amount of heat loss from the building and the amount of heat loss from the outdoor controller 55. This proportional relationship must be maintained in order to maintain a substantially constant temperature within the building, since the thermostatic element 58 controls both the supply of heat to the building and the supply of heat to the outdoor controller 55. Since the amount of heat delivered to the building is decreased as the outdoor temperature increases in the manner pointed out above, the amount of heat delivered to the outdoor controller 55 must likewise be decreased as the outdoor temperature increases to maintain this proportional relationship. Therefore, the resistance 73 and the slider 71 are connected in series with the heater 65 so that when the slider 71 is moved to the left with respect to the resistance 73 by an increase in outdoor temperature, the amount of heat delivered to the block 56 is thereby decreased. Since both sliders 71 and 72 are operated conjointly by the thermostatic element 68, the amount of heat delivered to the building and to the outdoor controller are proportionately reduced, and the predetermined proportional relationship between the heat supplies and the heat losses is maintained. By reason of this construction, the building is maintained at all times at a substantially constant temperature and over-heating of the building during mild weather is prevented.

The variable resistance 123' is provided in circuit with the coil 115 and may be adjusted to add resistance to the circuit through the coil 115 to prevent substantially complete short circuiting of the coil 115. This prevents complete closing movement of the valve 19 in the same manner that variable resistance 74 prevents complete opening movement of the valve 19. Therefore by adjusting the variable resistance 123' a small amount of steam may be permitted to flow through the radiators at all times during extremely cold weather. If desired, the variable resistance 123' may be operated by an outdoor thermostat to limit the closing movement of the valve during extremely cold weather.

Movement of the slider 132 by manual manipulation of the knob 133 out of engagement with the "automatic" contact, and into engagement with the resistance coil 140, breaks the circuit to the switch arm 84 to render automatic control of the valve 19 inoperative. Since the left hand end of the coil 140 is connected to the coil 114, the right hand end thereof is connected to the coil 111 and the slider 132 is connected to the junction of coils 111 and 114 manual movement of the slider 132 along the coil 140 will cause operation of the valve 19. Movement of the slider 132 to the left with respect to the coil 140 causes partial short circuiting of the coil 114 to increase the energization of the coil 111 and decrease the energization of the coil 114 to cause opening movement of the valve 19 in the manner pointed out above. Likewise, right hand movement of the slider 132 with respect to the coil 140 causes partial short circuiting of the coil 111 to decrease the energization thereof and increase the energization of the coil 114 to cause closing movement of the valve 19. The coils 111 and 114 are rebalanced by the slider 36 co-acting with the balancing potentiometer coil 37 in the manner pointed out above. Since the potentiometer coils 140 and 37 are connected in parallel and since short circuiting of the coils 111 and 114 may not be complete, the valve 19 may be made to assume any given position by manipulation of the slider 132 with respect to the coil 140.

In addition to providing an automatic control system wherein the temperature within a building is maintained substantially constant, and wherein "over-shooting" of the building temperature during mild weather is prevented, I have provided means whereby the automatic control may be rendered inoperative and the building heating means placed under manual control.

Although I have disclosed one form of my invention, various modifications thereof may become apparent to those skilled in the art and, consequently, this invention is to be limited only by the scope of the appended claims and the prior art.

I claim as my invention:

1. In a temperature control system for a space, the combination of means for supplying heat to the space, a controller having heat supplying means and thermostatic means, the thermostatic means controlling both heat supplying means, and thermostatic means outside of said space for modulatingly regulating the heating effect of both of said heat supplying means.

2. In a temperature control system for a space, the combination of means for supplying heat to the space, a controller having heat supplying means and thermostatic means, the thermostatic means controlling both heat supplying means, and thermostatic means outside of said space for adjusting both of said heat supplying means.

3. In a temperature control system for a building, the combination of temperature changing means for the building, an outdoor controller subject to the same atmospheric conditions as the building and having temperature changing means and thermostatic means, the thermostatic means controlling both temperature changing means, and thermostatic means for adjusting both temperature changing means.

4. In a temperature control system for a building, the combination of temperature changing means for the building, an outdoor controller subject to the same atmospheric conditions as the building and having temperature changing means and thermostatic means, the thermostatic means controlling both temperature changing means, and thermostatic means responsive to outdoor temperatures for adjusting the temperature changing effect of both of said temperature changing means.

5. In a temperature control system for a building, the combination of valve means for controlling the supply of heating fluid to the building, means responsive to outdoor conditions for opening or closing said valve means, and means responsive to outdoor conditions for gradually limiting the opening movement of said valve means in accordance with changes in outdoor conditions.

6. In a temperature control system for a space, the combination of means for supplying heat to said space, thermostatic means including heating means for controlling said heat supplying means to admit heat to said space upon a call for heat, and means responsive to temperatures outside of said space for gradually limiting the amount of heat supplied to said space in proportion to increases in outside temperatures.

7. In a temperature control system for a building, the combination of means for supplying heat to said building, control means responsive to outdoor conditions for controlling said heat supplying means to admit heat to said space upon a call for heat by said control means, and means responsive to outdoor conditions for gradually regulating the amount of heat so admitted in accordance with changes in outdoor conditions.

8. In a temperature control system for a space, the combination of means for supplying heat to said space, thermostatic means including heating means for controlling said supplying means to admit heat to said space upon a call for heat, and means responsive to temperatures outside of said space for gradually limiting the amount of heat supplied to said space as the temperature outside of the space increases and in proportion to the amount of increase.

9. In a temperature control system for a building, the combination of means for supplying heat to said building, control means responsive to outdoor conditions for controlling said heat supplying means to admit heat to said space upon a call for heat by said control means, and means responsive to increasing outdoor temperature conditions for gradually decreasing the amount of heat so admitted.

10. In a temperature control system for a building, the combination of heat supplying means for said building, an outdoor controller subject to the same atmospheric conditions as said building, said outdoor controller including thermostatic means and heat supplying means, said thermostatic means controlling both heat supplying means, whereby heat is intermittently supplied to said building and said controller to maintain a substantially constant temperature in said building, and means responsive to outdoor temperatures for adjusting the amount of heat delivered to the building and the outdoor controller.

11. In a temperature control system for a building, the combination of heat supplying means for said building, an outdoor controller subject to the same atmospheric conditions as said building, said outdoor controller including thermostatic means and heat supplying means, said thermostatic means controlling both heat supplying means, whereby heat is intermittently supplied to said building and said controller to maintain a substantially constant temperature in said building, and means responsive to outdoor temperatures to decrease the amount of heat delivered to the building and the outdoor controller as the outdoor temperature increases.

12. In a temperature control system for a building, the combination of temperature changing means for the building, an outdoor controller subject to the same atmospheric conditions as the building and having temperature changing means and thermostatic means, the thermostatic means controlling both temperature changing means, thermostatic means for adjusting both temperature changing means, and means for causing manual control of said building temperature changing means.

13. In a temperature control system for a building, the combination of heat supplying means for said building, an outdoor controller subject to the same atmospheric conditions as said building, said outdoor controller including thermostatic means and heat supplying means, said thermostatic means controlling both heat supplying means, whereby heat is intermittently supplied to said building and said controller to maintain a substantially constant temperature in said building, means responsive to outdoor temperatures for adjusting the amount of heat delivered to the building and the outdoor controller, and means for rendering said thermostatic means inoperative to control said building heat supplying means and for controlling said building heat supplying means manually.

14. In a temperature control system for a building, the combination of valve means for controlling the supply of heat to the building, an outdoor controller subject to the same atmospheric conditions as the building and including heating means and thermostatic means, said thermostatic means simultaneously and intermittently operating said heating means and opening said valve means, and means to limit the opening movement of said valve means and to decrease the heating effect of said heating means upon the occurrence of mild atmospheric conditions.

15. In a temperature control system for a space, the combination of means for supplying heat to the space, a controller having heat supplying means and thermostatic means, the thermostatic means controlling both heat supplying means, thermostatic means outside of said space for regulating the heating effect of both of said heat supplying means, and means for controlling said heat supplying means for the space independently of said thermostatic means.

GEORGE H. FISHER.